(12) United States Patent
Boyd

(10) Patent No.: US 6,409,199 B1
(45) Date of Patent: Jun. 25, 2002

(54) REAR WHEEL STEERING SYSTEM

(76) Inventor: Joseph James Boyd, 103 Timberlane Rd., Cumming, GA (US) 30040

( * ) Notice: Subject to any disclaimer, the term of this patent is extended or adjusted under 35 U.S.C. 154(b) by 0 days.

(21) Appl. No.: 09/729,570

(22) Filed: Dec. 4, 2000

(51) Int. Cl.[7] ................................................ B62D 53/06
(52) U.S. Cl. ....................................... 280/426; 280/442
(58) Field of Search ............................... 280/426, 442, 280/443, 444, 445, 98, 99; 180/400, 408, 411

(56) References Cited

U.S. PATENT DOCUMENTS

| | | | | |
|---|---|---|---|---|
| 5,213,353 A | * | 5/1993 | Williams | 280/426 |
| 5,329,451 A | * | 7/1994 | Notsu | 280/442 |
| 5,479,999 A | * | 1/1996 | Proia | 280/426 |
| 5,579,228 A | * | 11/1996 | Kimbrough et al. | 180/421 |
| 5,630,604 A | * | 5/1997 | Ducote | 280/443 |

FOREIGN PATENT DOCUMENTS

| | | | | |
|---|---|---|---|---|
| JP | 62-289472 | * | 12/1987 | 280/442 |

* cited by examiner

*Primary Examiner*—Daniel G. DePumpo
(74) *Attorney, Agent, or Firm*—Todd Deveau; Ryan A. Schneider; Troutman Sanders LLP

(57) ABSTRACT

A method and apparatus for long vehicles to make sharp turns on city streets without running up on the curb. The back wheels of the vehicle are steered so that when the semi or truck is making a sharp turn, the rear wheels continue straight down the street to the intersection and then turn, even though the semi and the front of the trailer have already turned in a normal manner.

3 Claims, 6 Drawing Sheets

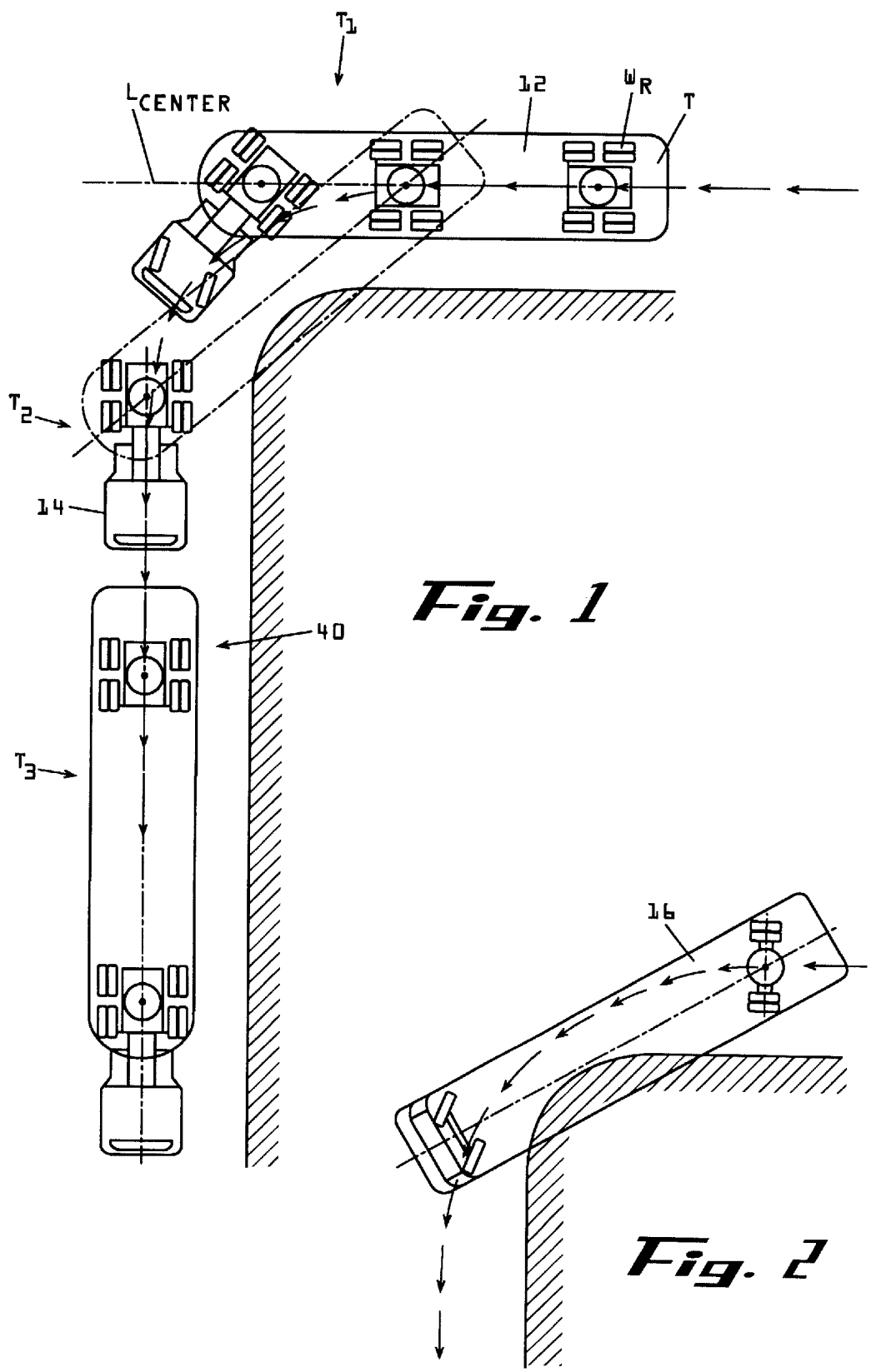

REAR WHEEL STEERING SYSTEM

BACKGROUND OF THE INVENTION

1. Field of the Invention

The present invention generally relates to steering mechanisms for long vehicles, including, among others, trucks, busses, stretch limos, and semi-tractors and trailers. More specifically, the present invention pertains to a rear wheel steering system for long vehicles, enabling the vehicles to safely and easily clear an inside curb when making sharp turns on narrow city streets.

2. Description of the Related Art

Presently, long vehicle turns in tight situations can be quite dangerous. For example, when turning from one city street to another, the driver of a large trailer rig must begin the turn in the second lane over from the curb, thus taking up both lanes of traffic, in an effort to prevent the rear tandem wheels of the rig from running over the curb and perhaps up on the sidewalk. Similarly, long vehicle turns across four lane intersections can be dangerous. If the trailer is crossing a four lane road, it may take two lanes into the intersection, and take two lanes as it turns.

If the semi is pulling two trailers, the above problem is compounded. In such a situation, the semi turns into the intersection, the first trailer cuts across the curb, and the second trailer crosses on the sidewalk. Long trucks, busses and stretch limos, like the trailers, also must take more than their share of the road when turning sharp corners.

There have been several attempts to overcome the above disadvantages. Some long ladder fire trucks and ladder trailers have a seat and steering wheel over the rear wheels, and a fireman steers the back wheels so as to miss the curb. Steering the back wheels of a vehicle is old art. An early automobile had both front and back wheels that were steerable. Yet, directly steering the rear wheels of a vehicle has its share of problems as well, including the need of an additional driver, just to name one.

It would be beneficial to provide a rear wheel steering system that a single driver can operate by the push of a button. Such a system would improve truck hauling safety. In view of the prior art it can be seen that there is a need for a modified rear wheel steering system for long vehicles. It is to the provision of such a system that the present invention is primarily directed.

BRIEF SUMMARY OF THE INVENTION

The present invention is a rear wheel steering system that enables a long vehicle to make tighter turns than are possible with conventional steering assemblies. The present rear wheel steering system requires only minimal intervention by the driver, and allows the trailerrig, truck or bus to make sharp turns without crossing into the other lane, yet providing for the rear wheels to miss the curb.

The present rear wheel steering system comprises a control system and a gyrocompass assembly housed on a pivotal rear wheel unit. The control system is capable of automating the steering process of the rear wheels, while the gyrocompass assembly is capable of defining the path for the rear wheels to follows.

The description of the present invention will include specific references to a tractor-trailer vehicle type, but it will be understood that the steering system is useful in all manner of vehicle types that incorporate rear wheel assemblies. The term "lengthwise centerline" will refer to the centerline of the tractor-trailer running from the front end to the back end of the cab. Thus, if the cab and trailer are in alignment, for example, in normal highway driving conditions, the lengthwise centerline would in fact extend from the front of the cab to the end of the trailer. The term "rear wheel unit lengthwise centerline" may, or may not, lie on the lengthwise centerline of the cab. During normal hauling, the centerlines would lie on atop the other. But when the rear wheel unit pivots relative to the length of the trailer, the rear wheel unit lengthwise centerline will similarly angle away from the trailer's lengthwise centerline.

The present steering system has a "normal driving" state and an "automated turn" state. In the normal driving state, the rear wheels are locked in alignment with the vehicle's centerline, like any standard trailer. The normal driving state is the typical highway hauling use of the vehicle. As the long vehicle approaches a sharp turn, the driver of the vehicle activates the control system of the rear wheel steering system from the normal driving state to the automated turn state, wherein the rear wheels are then steerable.

The pivotal rear wheel unit enables the rear wheels to turn through a turning angle about the lengthwise centerline of the vehicle. In city driving applications, the wheels may be powered by fluid cylinders, electric motors or other standard means.

While the vehicle is on the straight highway, the system is in the normal driving state, and the present system is deactivated. The driver can then activate the system via the control system when entering a turn. Upon activation of the present system, the gyrocompass assembly that is mounted on the rear wheel unit begins to operate, and the rear wheel unit is unlocked from the conventional highway hauling non-pivotable rear wheel unit orientation.

The gyrocompass assembly incorporates a gyrocompass, which is a two degree of freedom stable platform having a gyroscope (or "gyro") supported in gimbal rings. The gyroscope is rotatable about a vertical axis. The centerline of the gyro is normally maintained in alignment with the trailer's lengthwise centerline by biasing elements of the gyrocompass assembly, but once energized, the gyro can resist turning with a force greater than that of the biasing elements. The biasing elements can be springs.

When the semi begins to turn, the trailer also begins to turn, and the rear wheels of the trailer are subjected to a turning force. Yet, the gyro still points as it did when it started (aligned in the lengthwise centerline of the vehicle), so when the trailer turns the trailer frame presses against a gyro frame of the gyrocompass assembly. Upon such contact, a switch to a solenoid valve closes, which operates a turning mechanism of the gyrocompass assembly. The turning mechanism can comprise at least one cylinder. For example, when the switch is activated, one of two hydraulic cylinders begins to extend. As the cylinder is attached at one end to the trailer and the other end to the rear wheel unit, when the cylinder begins to extend, it pushes (or pulls) the unit about the pivot, to relieve the contact between the trailer frame and the gyro frame. This maintains the rear tandem wheels in alignment now with the gyro's centerline, as opposed to the trailer's centerline.

When the semi enters the intersection and turns down the cross street, the front of the trailer turns at an angle to the semi. However, the rear wheels of the trailer do not turn with the trailer but roll straight down the road guided by the gyrocompass assembly. As the semi continues down the cross street, the turning angle between the lengthwise centerline of the trailer and the centerline of the rear wheels becomes increasing larger, until a preset turning angle is reached, opening a switch of the control system. The rear wheels are then brought back into alignment with the trailer's centerline.

The rear wheels of very long trailers are provided with a turning angle of approximately 45 degrees. This means that about one-half of the trailer has moved into the cross street before the rear of the trailer starts to turn. The wheels thus easily miss the curb, but the body of the trailer might overlap, unless the curb is rounded off.

The turning angle that the wheels can pivot on long, self powered equipment like trucks, busses, and automobiles might be limited by the drive shaft angle, but the turn can be shortened by having a maximum turning angle of approximately 30 degrees. The turn of the rear wheels does not start until the maximum turning angle is reached, and then they would need to turn only (90−30=60) degrees more. A standard front wheel drive set of wheels would allow a greater angle and still take a standard drive shaft.

When the trailer or truck is fully in the cross street and the wheels have realigned with the vehicle's centerline, they are locked in position for highway hauling.

The control system can be adjusted to allow the driver some control over the angle the wheels can turn and the time to return. For example, the rear trailer wheels can be guided straight ahead to the intersection by the gyrocompass assembly, as it is when it is controlled automatically. As the trailer turns, it presses a switch against the gyroscope frame, causing the steering cylinder to keep the wheels aligned with the gyroscope, and the gyroscope remains aligned with the position of the trailer when the gyro was energized. The rear wheels of the trailer continue to roll straight towards the intersection. When the trailer has turned through an angle to the rear wheels of, for example, 45 degrees, it hits a stop on the tandem wheel unit and can not further turn. The trailer's wheels remain at this angle, so that the rear of the trailer moves the rest of the way into the intersection at the angle of the wheels. As the rig comes into alignment, the driver switches the controls back to the normal driving position.

For normal sized trailers, trucks, busses and the like, the rear wheels may be returned to the centerline automatically. But for very long vehicles, or two trailers in line, it would be best to let the trailer continue into the intersection at the maximum turning angle of the wheels.

Before the steering system of the present invention, there were few very long trucks, busses or fire engines, but once it is known that such vehicles can make sharp turns if they have the present rear wheel steering system, they may become more widespread.

BRIEF DESCRIPTION OF THE FIGURES

FIG. 1 is a cutaway plan view of three different "snapshots" of a semi and trailer turning on a city street, wherein the turning angle is approximately 45 degrees.

FIG. 2 is a cutaway plan view of a long bus rolling into the intersection, wherein the turning angle is approximately 45 degrees.

DETAILED DESCRIPTION OF THE PREFERRED EMBODIMENTS

Figure 3:
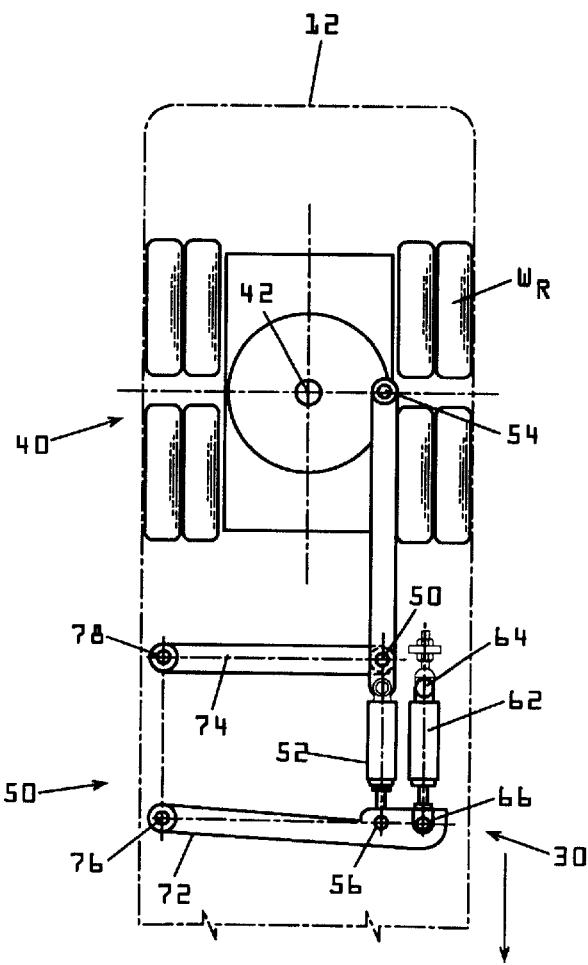
FIG. 3 is a cutaway plan view of the pivotal rear wheel unit of the present invention and the turning mechanism of the gyrocompass assembly shown as hydraulic control cylinders.

Several of the advantages of the present invention are illustrated in FIGS. 1 and 2. FIG. 1 shows truck T in various stages of turning through locations $T_1$, $T_2$ and $T_3$. At location $T_1$, the trailer 12 of the truck T has just reached the intersection, wherein the rear wheels $W_R$ are in line with the lengthwise centerline $L_{CENTER}$ of the trailer 12. The semi is beginning the turn at $T_1$.

At location $T_2$, the rear wheels $W_R$ of trailer 12 have reached the total turning angle, in this case 45 degrees. The semi 14 has completed the turn and is moving straight down the street. The rear wheels of the trailer easily make the remainder of the turn without coming close to the curb. At location $T_3$, the semi 14 and the trailer 12 are shown with the wheels $W_R$ realigned with the trailer centerline.

FIG. 2 shows a bus or truck 16 with the wheels at about 30 degrees with the vehicle centerline. The line of arrows illustrates the coarse of the rear wheels. The body of the bus overhangs the curb, but the wheels miss the curb.

In comparing FIG. 1 and FIG. 2, one can see how increasing the wheel angle from 30 degrees to 45 degrees greatly increases the ease of making the turns. At 45 degrees, very long vehicles can easily make sharp turns in narrow city streets. In order to provide long vehicles with the turning capabilities as described above, a novel rear wheel steering system was developed and became the basis of the present invention.

The present invention is a method and apparatus to restrain the pivotal rear wheel unit from turning with the trailer at an intersection until a preset angle is reached. The angle of interest is defined as the angle between the centerline of the rear wheel unit and the lengthwise centerline of the vehicle. This angle is determined by monitoring a gyrocompass (which indicates the lengthwise centerline of the vehicle before the turn) and the centerline of the vehicle (ever changing orientation through the turn).

For example, assume a tractor-trailer is traveling straight down the road. Arbitrarily, the centerline of the trailer is at 0 degrees, as is the rear wheel unit. When the trailer begins to turn onto a perpendicular road, the trailer centerline will rotate from 0 to 90 degrees. Ordinarily, somewhere in the turn, the rear wheel unit is subjected to a turning force to follow the trailer. The present invention resists this turning force on the rear wheel unit until a preset angle is encountered, the angle being the angle between the trailer centerline as it changes through the turn, and the original 0 degree position. The original 0 degree orientation is maintained through the turn by a gyrocompass. Only when the present angle is reached, does the present invention turn the rear wheel unit back into alignment with the trailer centerline, which will be the 90 degrees upon completion of the turn. Thus, the present invention forces the rear wheel unit to maintain the 0 degree position longer than it would without the present invention, and then turns the rear wheel unit into the turn.

The rear wheel steering system of the present invention comprises a gyrocompass assembly 30 housed on a pivotal rear wheel unit 40, and a control system. The gyrocompass control system of the present invention comprises the gyroscope 30 a pivotable rear wheel unit 40, and a turning mechanism 50. The pivotable rear wheel unit 40 illustrated in FIGS. 3–5 includes four sets of tandem rear wheels $W_R$. The unit 40 is pivotably attached to the trailer 12 via pivot 42.

The turning mechanism 50 is capable of pivoting the rear wheel unit 40 about pivot 42. Preferably, the turning mechanism 50 comprises at least one extension member 52 having a unit end 54 attached to the rear wheel unit 40, and an extension end 56. As shown in FIG. 3, the turning mechanism can further comprise a second extension member 62 having a fixed end 64 attached to the trailer 12, and an extension end 66. The turning mechanism 50 can further comprise two pivot arms 72, 74 rotatable about points 76, 78, respectively. Ends 56, 66 of the extension members 52, 62, respectively, are pivotable with pivot arm 72. Extension member 52 is also pivotable with pivot arm 74 between the ends 54, 56 of extension member 52, illustrated as point 58.

Figure 4:
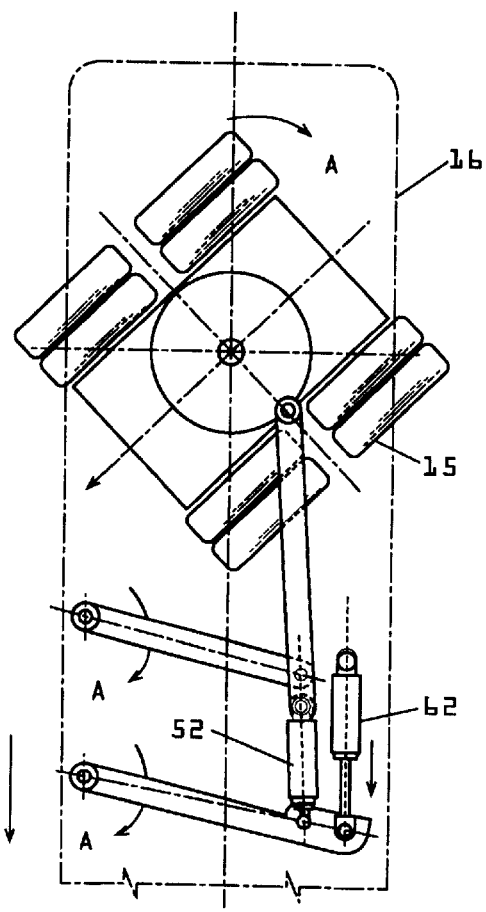
FIG. 4 is the cutaway plan view of FIG. 3, illustrating how a first cylinder extension turns the rear wheel unit about a pivot enabling the truck to turn left.
Figure 5:
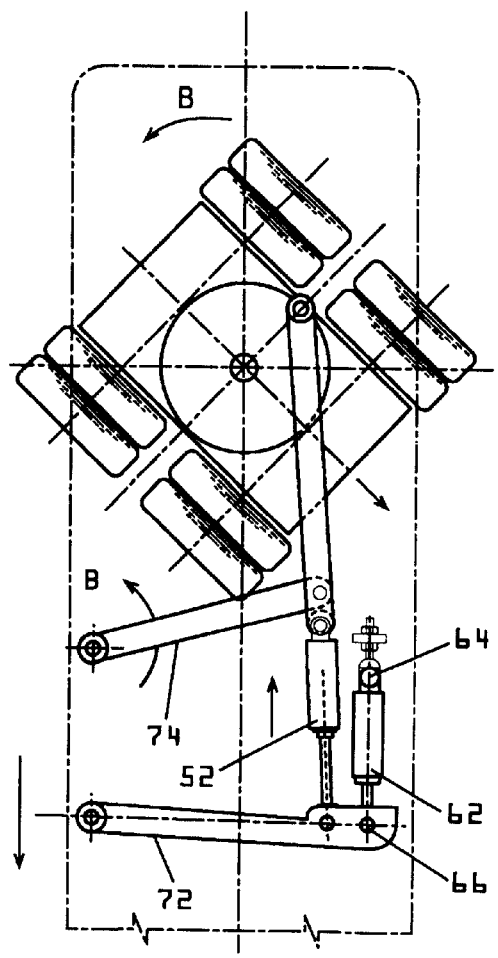
FIG. 5 is the cutaway plan view of FIG. 3, illustrating how a second cylinder extension turns the rear wheel unit about a pivot enabling the truck to turn right.

While steering the rear wheels of a trailer is old art, the preferred method of steering shown in FIGS. 3–5 is novel, and has a number of desirable features. As shown, when the wheels $W_R$ are aligned with the trailer centerline $L_{CENTER}$, both extension members 52, 62 are retracted, as in FIG. 3, and both pivot arms 72, 74 are generally perpendicular to $L_{CENTER}$. When extension member 62 extends, as in FIG. 4, the unit 40 pivots to turn the trailer 12 to the left. Extension of extension member 62 rotates both pivot arms 72, 74 in the direction A, as does so to unit 40.

Similarly, when extension member 52 extends, as in FIG. 5, the unit 40 pivots to turn the trailer 12 to the right. Extension of extension member 52 rotates only pivot arm 74 (not pivot arm 72), in the direction B, as does unit 40, while pivot arm 72 maintains a generally perpendicular relationship to $L_{CENTER}$ because extension member 62 is retracted, thus fixing the distance between fixed end 64 and extension end 66.

Using two separate extension members 52, 62 in this fashion allows the right and the left turns to be performed by separate controls systems—separate electrical and separate hydraulic systems. This enable the extension member 52, 62 to follow "on" and "off" signals of the gyro switch without resorting to a servo system. This preferred means of turning the wheels, however, does not limit the scope of this invention, and any other means of making the wheels follow the gyro position may be used, including the use of king pins and spindles, among others.

Figure 6:
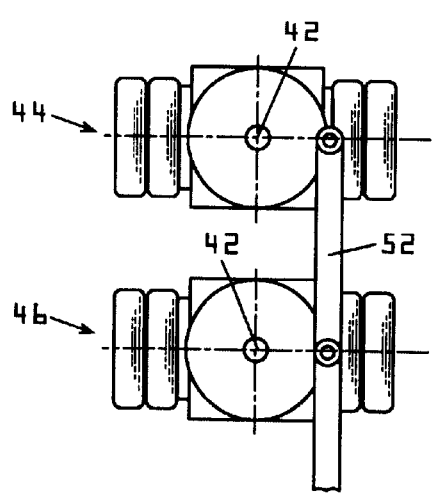
FIG. 6 is a plan view of the tandem wheels being separate, and each axle capable of being pivoted.
Figure 7:
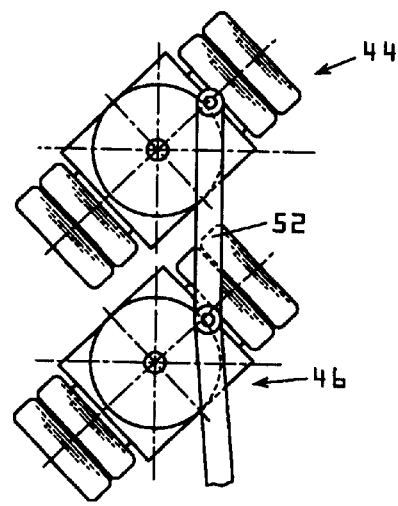
FIG. 7 is the view of FIG. 6, wherein the trailer is turning right.

FIGS. 6 and 7 illustrate unit 40 as two subunits 44, 46, both capable of pivoting about a pivot 42, and further illustrate a modified first extension member 52 pivotally attached to both subunits 44, 46. Subunits 44, 46 have their axles separated so as to turn independently.

The gyrocompass assembly 30 of the present invention further comprises a gyrocompass 80. As shown in FIGS. 8–11, the gyro 80 is held in gimbal 82, which gimbal 82 enable the gyro 80 to pivot vertically. A first biasing element 84 maintains the gyro 80 horizontally when at rest. The first biasing element 84 can be one or more springs. The gimbal 82 is capable of horizontal rotation about vertical axis 86, and a second biasing element 88 keeps the gimbal 82 centered between switches 92, 94. The second biasing element can be one or more springs. The total movement of the gimbal 82 is limited by stops 96 and 98. When the gyro 80 is brought up to speed, it remains in this position, and the tab remains centered between the switches 92, 94.

Figure 8:
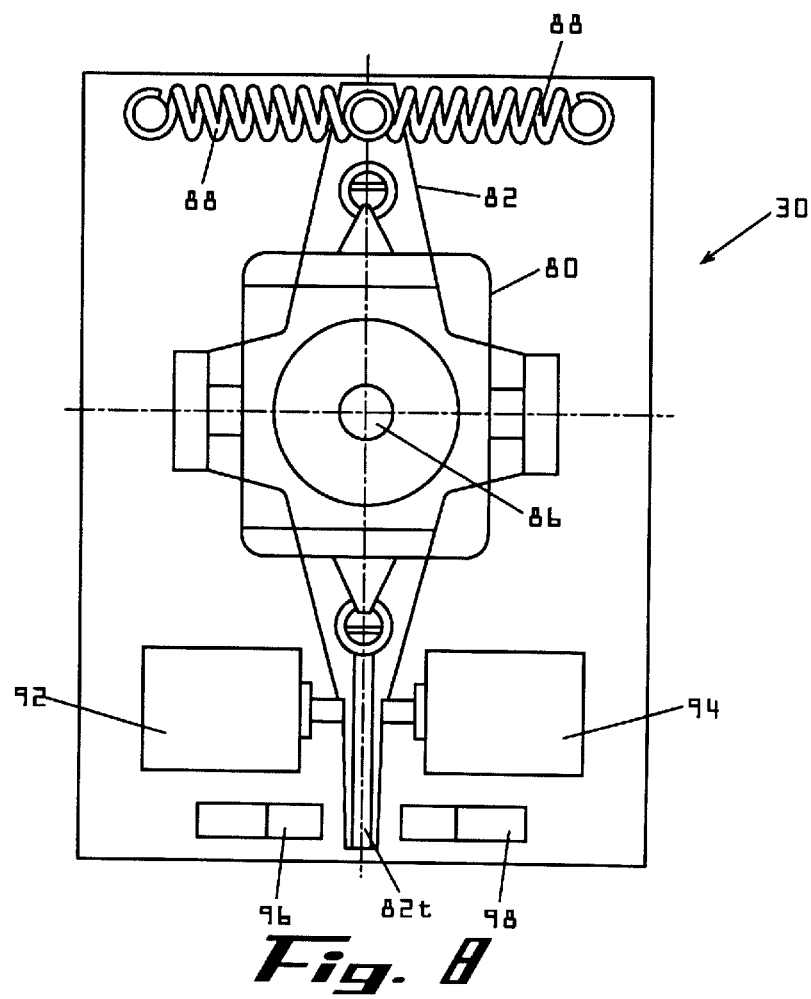
FIG. 8 is a top view of the gyrocompass assembly of the present invention according to a preferred embodiment.
Figure 9:
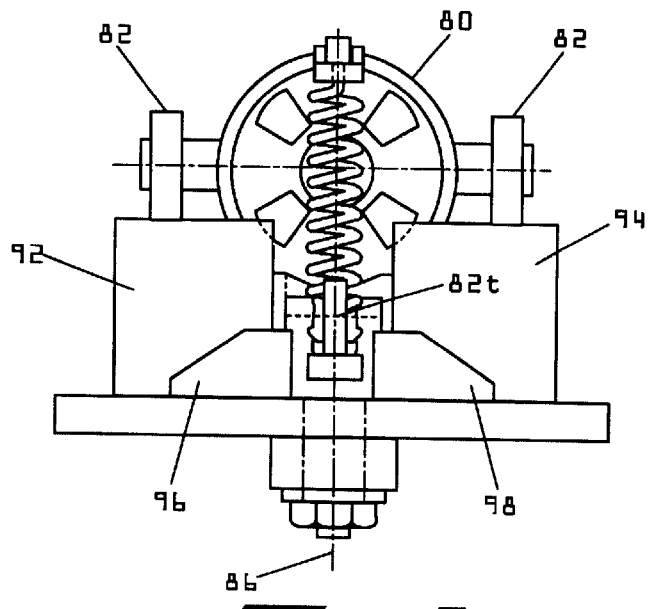
FIG. 9 is a side view of the gyrocompass assembly of FIG. 8.
Figure 10:
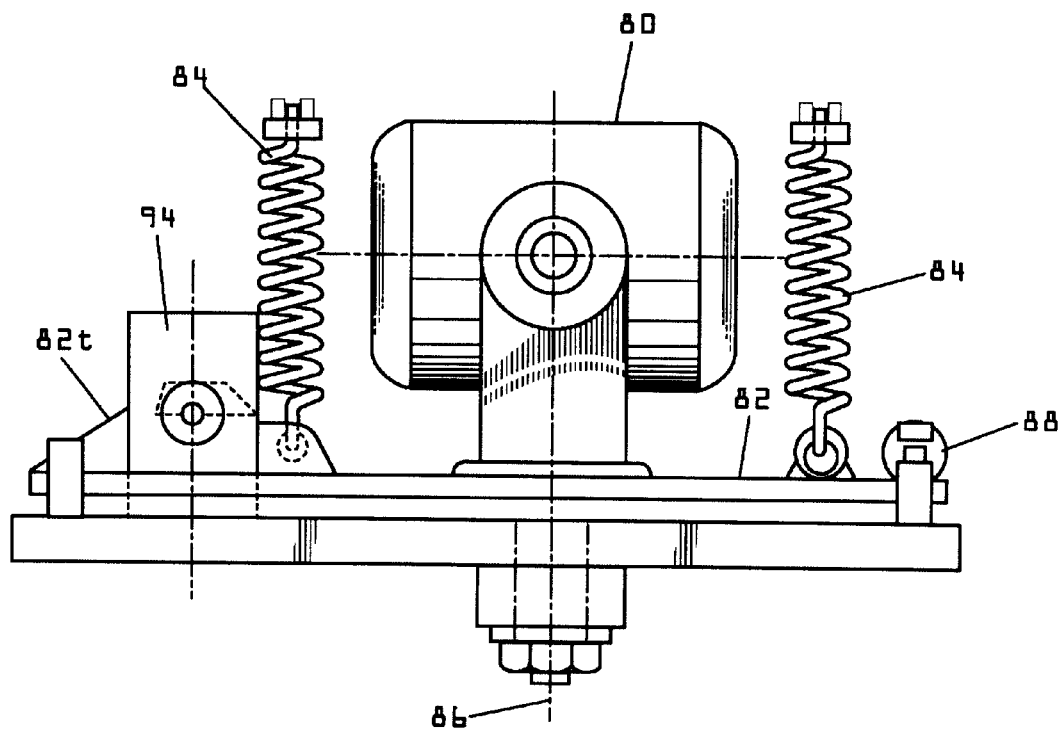
FIG. 10 is a front view of the gyrocompass assembly of FIG. 8.
Figure 11:
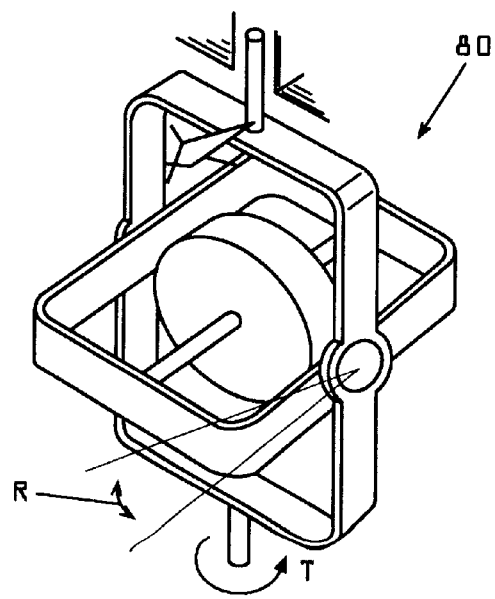
FIG. 11 is an idealized drawing of a two degree of freedom gyroscope.

FIGS. 8–10 are different views of the preferred gyrocompass 80, showing how the gyro motor is held in a horizontal position with springs and is pivoted vertically. The gyro is centered horizontally with springs, and that if the frame turns, it will push against the gyro gimbals and operate a switch. After that, any further movement will be limited by a stop. FIG. 11 illustrates how a torque (T) applied about the vertical axis will be resisted by an opposite torque if the gyro in the horizontal gimbal ring is allowed to precess.

The present rear wheel steering system preferably operates as follows. When the trailer 12 is highway hauling, the wheels $W_R$ are locked in exact alignment with the trailer centerline $L_{CENTER}$, and the trailer tracks the semi 14 as is normal. If the trailer must make a sharp turn, whether at a railroad crossing or on a narrow city street, the driver engages the present invention. As the driver approaches the tight turn, he activates the control system 100, shown in FIG. 12, and the gyro 80 is quickly brought up to speed.

When the gyroscope 80 is energized, it will remain as it is in line with the wheel unit 40, and if the wheels $W_R$ are then turned from their original position, the gyroscope 80 resists and a switch 92, 94 is closed. This in turn operates one or both of the extension members 52, 62 to bring the wheels $W_R$ back to their original position.

Elaborate servo systems can be used to turn the wheels $W_R$, but, since most turns take less than a minute, some friction and small deviations due to the biasing elements 84, 88 will typically go unnoticed. So, in the preferred gyro control as is shown in FIGS. 8–11, the gyro 80 may just be a standard electric motor. An electric motor will resist a turning moment if it is mounted in gimbal rings and allowed to precess.

If the unit 40 begins to turn, the gyro 80 precesses (tilts about its horizontal axis) and the gimbal 82 remains unmoved, and one of the switches 92, 94 moves against the gimbal tab 82t. This operates one or both of the extension members 52, 62 to rotate the unit 40 back to its original position. This operation is repeated over and over to keep the wheels moving straight down the street as the trailer turns the corner.

Figure 12:
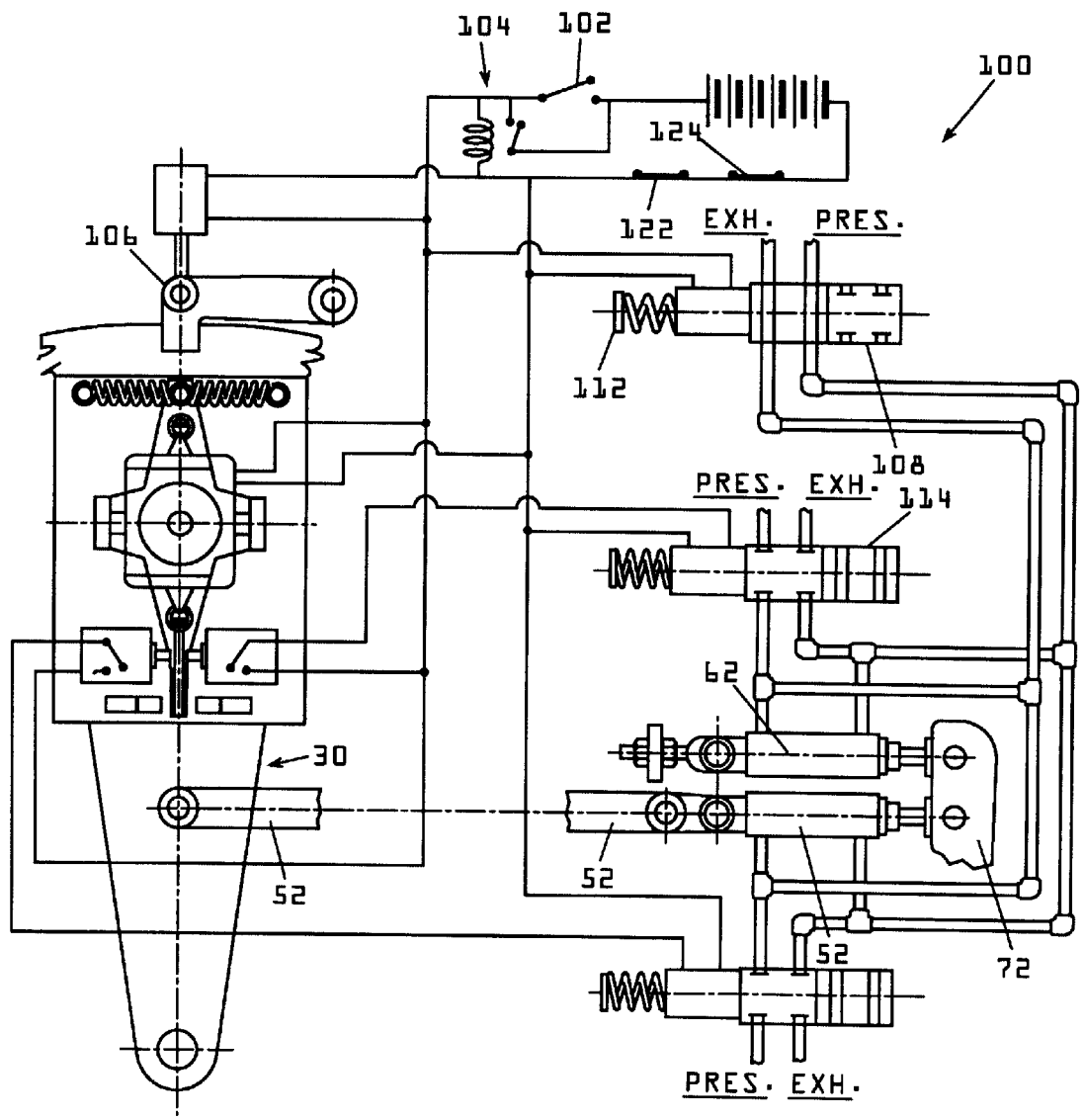
FIG. 12 is a schematic diagram showing the preferred embodiment of the control system of the present invention, including electrical and hydraulic systems.

As shown schematically in FIG. 12, as the driver approaches an intersection, he closes a start button 102, located, for example, on the dash of the semi. A holding coil and switch 104 lock in the circuit. This energizes the gyrocompass 80, and it matches the direction of the trailer movement, which, thereafter, is the zero direction of the gyrocompass 80. This also puts the gyrocompass 80 in control of the extension members 52, 62, and opens a tandem lock 106 to allow the tandem wheels $W_R$ to turn relative to the trailer.

Before the system is energized, a valve 108 is held in the open position by, for example, a spring 112. This maintains both extension members 52, 62 retracted. After energizing, the valve 108 blocks the lines, and this places the extension members 52, 62 under the control of valves 114 and 115.

As the semi enters the intersection, the trailer turns the wheels slightly, and the gyro closes one of the switches, say switch 92. Momentarily, the valve 108 is energized, putting pressure on extension member 52. The member 52 is extended a small amount, forcing the wheel unit 40 and the gyrocompass assembly 30 to turn. The tab 82t on the gyro gimbal 82 returns to center, opening the switch 92, and blocking the member 52 at the furthermost extended position. As the semi turns further down the street, this operation is repeated over and over until the wheels $W_R$ have turned against a switch 122 or 124 at a stop, and this breaks the circuit. The tandem wheels pivot back to align with the trailer. With long trailers, the wheels may be left against the stop the remainder of the way around the corner, and the circuit broken by the driver.

Although the present invention has been described with respect to particular embodiments, it will be apparent to those skilled in the art that modifications to the method of the present invention can be made which are within the scope and spirit of the present invention and its equivalents.

What is claimed is:

1. A method of rear wheel steering for a vehicle in a turn, the vehicle having rear wheels located on a pivotal rear wheel unit, the vehicle having a lengthwise centerline, the method of steering comprising the following steps:

(a) energizing a gyrocompass that will resist the turning force of the vehicle, the gyrocompass indicating the orientation of the rear wheel unit prior to the turn;
   (b) detecting the orientation of the gyrocompass relative to the orientation of centerline of the vehicle through the vehicle turn; and
   (c) turning the rear wheel unit in response to the difference in the orientations of the gyrocompass and the vehicle centerline when a preset difference in the orientations is reached.

2. The method of steering according to claim 1, further comprising step (d) ending the turning of the rear wheel unit when the gyrocompass orientation and vehicle centerline orientation are parallel.

3. The method steering according to claim 1, the step (b) of detecting orientations comprising the following substeps:

(i) providing a gimbal in which the gyrocompass is held; and
   (ii) providing the gyrocompass with an extension movable between two detection devices, wherein when the extension contacts either of the two detection devices, the step (c) of turning begins.

* * * * *